United States Patent [19]
Bradley

[11] Patent Number: 6,031,362
[45] Date of Patent: Feb. 29, 2000

[54] METHOD AND APPARATUS FOR FEEDBACK CONTROL OF SWITCH MODE POWER SUPPLY OUTPUT TO LINEAR REGULATORS

[76] Inventor: Larry D. Bradley, 15366 Andorra Way, San Diego, Calif. 92129

[21] Appl. No.: 09/311,759

[22] Filed: May 13, 1999

[51] Int. Cl.$^7$ .............................. G05F 1/40; G05F 1/577
[52] U.S. Cl. .......................... 323/269; 323/267; 323/273
[58] Field of Search ................................... 323/268, 269, 323/270, 273, 274, 275, 276, 267; 307/82

[56] References Cited

U.S. PATENT DOCUMENTS

| 4,371,947 | 2/1983 | Fujisawa | 323/276 X |
| 5,525,895 | 6/1996 | Fishman | 323/268 |

*Primary Examiner*—Y. J. Han
*Attorney, Agent, or Firm*—Russell B. Miller; Charles D. Brown; Raymond B. Hom

[57] ABSTRACT

A method and apparatus for using feedback to control the output voltage of a Switch Mode Power Supply (SMPS) that is used as the input voltage to subsequent Low Drop Out (LDO) linear voltage regulators. A multiplexer and Analog to Digital Converter (ADC) are used to successively sample the output voltages of multiple parallel LDO regulators. The digitized voltage values are input to a digital processor that compares the LDO regulator output voltages with acceptable limits previously stored in memory. The digitized voltage values are used by the digital processor to control the output voltage of a SMPS that is used as the input voltage to the LDO regulators. The output voltage of the SMPS, and thus the input of the LDO regulators, is reduced to the minimum value that retains full performance of the LDO regulators. Operating each LDO regulator at full regulation ensures full performance of the LDO regulators. Minimizing the input voltage to the LDO regulators maximizes the efficiency of the total power supply. When integrated into a battery powered cellular phone, the invention maximizes efficiency thereby maximizing telephone talk time and standby time.

7 Claims, 2 Drawing Sheets

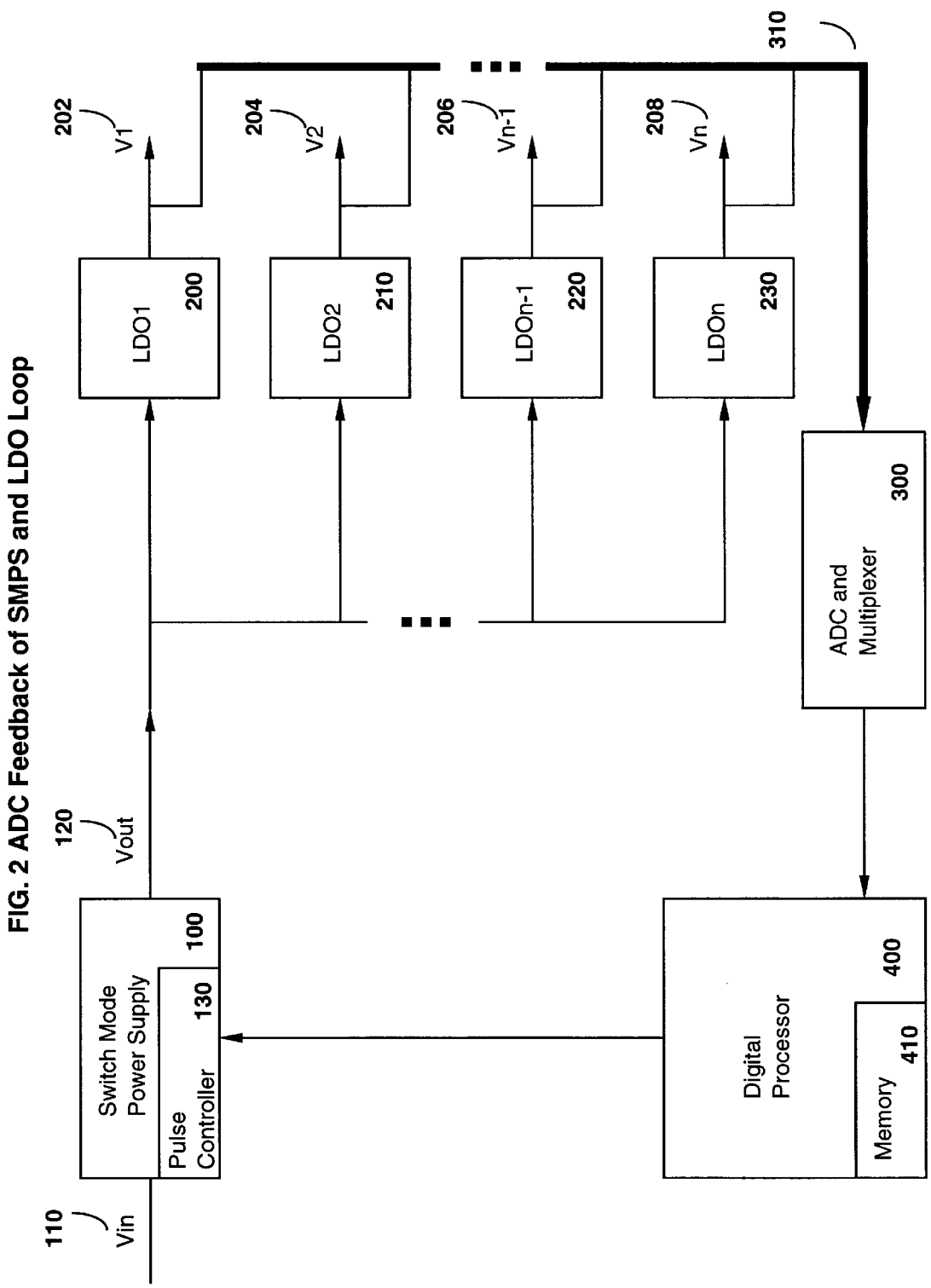
FIG. 2 ADC Feedback of SMPS and LDO Loop

METHOD AND APPARATUS FOR FEEDBACK CONTROL OF SWITCH MODE POWER SUPPLY OUTPUT TO LINEAR REGULATORS

BACKGROUND OF THE INVENTION

I. Field of the Invention

The present invention relates to wireless communication. More particularly, the present invention relates to feedback controlled power supplies and to a novel and improved method and apparatus for controlling the output voltage of a Switch Mode Power Supply (SMPS) that is used as an input voltage to subsequent Low Drop Out (LDO) linear voltage regulators such as used within a mobile phone.

II. Description of the Related Art

Wireless communication networks rely on the ability of multiple user terminals to provide sustained high quality communication. In the case of wireless telephone networks the mobile units must be capable of sustaining high quality voice and data transmission. The design requirement of sustained high quality voice and data transmission must be weighed against the design requirements of battery operation, small size, low cost, and high reliability.

A mobile unit or wireless phone integrates numerous complex circuits. An RF transceiver is used to provide the wireless communication link with base stations. The RF transceiver is comprised of a receiver and a transmitter. The receiver receives the RF transmission from the base station via an antenna interfaced to the mobile unit. The receiver amplifies, filters, and downconverts to basedband the received signal. The baseband signal is then routed to a baseband processing circuit. The baseband processing circuit demodulates the signal and conditions it for broadcast through a speaker to the user.

User input via keypad presses or voice input to a microphone is conditioned in the baseband processing circuit. The signal is modulated and routed to the transmitter. The transmitter takes baseband signals generated at the mobile unit and upconverts, filters, and amplifies the signal. The upconverted RF signal is transmitted to the base station through the same antenna as used for the receiver.

Frequency synthesizers are used to generate the local oscillators required to perform the downconversion in the receiver and the upconversion in the transmitter.

The requirement that a mobile unit operate under battery power presents various issues that must be addressed. Batteries can only provide a limited amount of energy. Conservation of power consumption is the only way to extend battery life. Battery voltage varies considerably over its useful life and varies a moderate amount due to the load placed upon it. When multiple batteries are used in series this problem is only compounded. Additionally, specific components within the mobile unit may require voltages greater than can reasonably be achieved with a series combination of batteries. The final RF power amplifier in the transmitter may require a supply voltage greater than that provided by a reasonable combination of batteries. Thus, it is apparent that circuits within the mobile unit cannot operate off of raw battery voltage. Where a voltage step up is required, a linear regulator alone cannot be used.

The basic structure of a linear regulator is a pass transistor and a control circuit. The pass transistor receives the unregulated input voltage at the input to the regulator and outputs a regulated voltage. The control circuit utilizes a highly stable voltage reference diode to control the pass transistor. Differences in the input voltage and the regulated output voltage appear across the pass transistor. The input current to the linear regulator is essentially equal to the output current from the regulator. The voltage across the pass transistor multiplied by the current flowing through the pass transistor represents the power dissipated by the pass transistor.

Additionally, since the pass transistor may represent the only series element between the input and output terminals of the linear regulator, the linear regulator cannot generate a step up in the output voltage.

Switch Mode Power Supplies (SMPS) provide a solution to some of the power supply problems. A SMPS can generate a stable output voltage for a wide range of input voltages. Depending on the SMPS configuration, it is able to either step up or step down the input voltage if required. In multiple output SMPS configurations, the SMPS can provide both step up and step down voltages. In the most basic representation of a SMPS the input voltage is successively switched on and off to create an average output voltage. Of course merely switching the input voltage on and off does not create a regulated output voltage. The SMPS utilizes the electrical properties of additional inductor and capacitor elements to achieve a regulated output. In an inductor the current flowing through the inductor cannot be changed instantaneously. Similarly, in a capacitor the voltage across the capacitor cannot be changed instantaneously. The SMPS uses the energy storage functions of the inductor and capacitor to smooth the output of a SMPS from discontinuous on-off pulses to a smooth regulated voltage. When a transformer is used as the inductor element the SMPS is able to provide input-output voltage step up as well as input-output ground isolation. A Pulse Width Modulator (PWM) is commonly used as the control circuit governing the on-off switching times.

The advantage in using a SMPS over a linear regulator is not limited to the ability to step up the input voltage. The efficiency of the SMPS can reach 90% or greater. The SMPS efficiency is essentially constant over a wide range of input voltages. In contrast, the efficiency of a linear regulator decreases in proportion to increases in input voltage. However, because of the inherent current switching within a SMPS the output voltage is not as clean as the output voltage from a comparably filtered linear regulator. In a SMPS there is output voltage ripple as well as output voltage spikes at the switching frequency. The switching spikes and minimal level of output voltage ripple usually have no adverse effect on the load circuits. However, sensitive circuits that have reduced power supply noise rejection capabilities may be adversely effected. These circuits may include reference oscillators, frequency synthesizers, and RF amplifiers. As an example, a reference oscillator may exhibit spurious frequency components at $f_0 \pm f_s$, where $f_0$ represents the center frequency of the reference oscillator and $f_s$ represents the power supply switching frequency. A linear regulator can be used following the SMPS to provide the cleanest available voltage source to any sensitive circuits. Low Drop Out (LDO) regulators are used because of the small input/output voltage differential they require to provide full regulation. The low input/output voltage differential on the linear regulator is important because the voltage differential directly relates to the power dissipation within the regulator. Any power dissipation in the regulator corresponds to a decrease in overall efficiency. Therefore, to maximize efficiency the output voltage of the SMPS needs to be at the minimum level required to ensure full regulation from the LDO regulator. The output voltage of the SMPS can be set to a constant value by taking into account worst case SMPS output variation and worst case LDO regulator input voltage requirements. SMPS output voltage variation stems from a variety of factors including SMPS part differences, temperature, and load variations. Similarly, LDO regulator input voltage requirements stem from part differences, temperature, and load variation. If the output voltage of the SMPS is to be constant, the voltage will be non-optimal for a majority of conditions because of the need to account for cumulative worst case scenarios. The result of non-optimal SMPS output voltage is a decrease in overall efficiency. Reduced efficiency results in reduced battery life. The effect for the user is reduced mobile phone talk times and standby times. What is needed is a method for dynamically optimizing the output voltage of the SMPS to maximize efficiency.

SUMMARY OF THE INVENTION

The present invention is a novel and improved method and apparatus for feedback control of the output voltage of a SMPS that serves as the input for subsequent LDO regulator stages, whereby the input voltage to the LDO regulators is kept at the minimum required to maintain full regulation. A multiplexer and Analog to Digital Converter (ADC) are connected to the outputs of a minimum of one LDO regulators, whereby the output voltages of the minimum of one LDO regulator is successively sampled. When a plurality of parallel LDO regulators is used the output voltages of each of the LDO regulators are successively sampled. The digitized samples are sent to a digital processor that controls the output voltage of the SMPS. The output of the SMPS is optimized to be the minimum voltage required to maintain full regulation in all of the LDO regulators. Depending on the sampling rate of the ADC the digital processor is able to optimize the output of the SMPS on each switching cycle or averaged over a multiple of switching cycles. In this manner, the output voltage of the SMPS is dynamically controlled to account for all part, temperature, and load variations exhibited by the SMPS/LDO regulator power supply combination.

When the LDO regulator input is optimized many gains in efficiency combine to increase the overall efficiency. The LDO regulator dissipates the minimum amount of power when the LDO regulator input voltage is at the minimum required to achieve full regulation. The decrease in LDO regulator power dissipation results in an equivalent decrease in the load on the SMPS. The decreased load requirement results in decreased IR (current x resistance) line losses. The decrease in the IR line loss is most evident in the lines from the battery to the SMPS. This is where the largest currents flow, especially when the SMPS is operating in a step up configuration. It can be seen that the optimization of the LDO regulator input voltage, i.e. the output of the SMPS, leads to numerous efficiency gains. This optimization of the SMPS output voltage/LDO regulator input voltage is performed by the present invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 2 is a block diagram of the ADC feedback loop controlling the SMPS output voltage using the LDO regulator output.

DETAILED DESCRIPTION OF THE PREFERRED EMBODIMENTS

Figure 1:
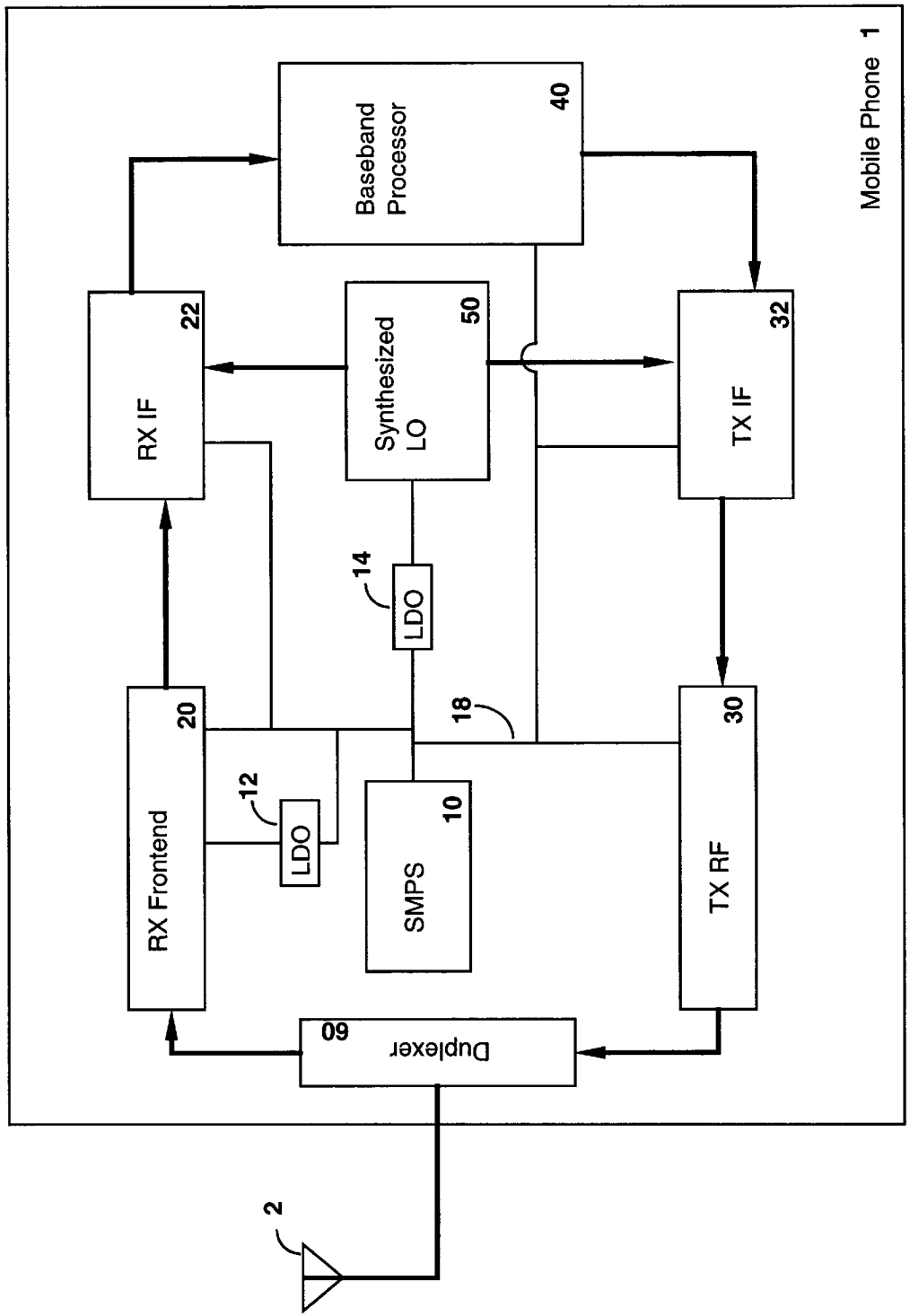
FIG. 1 is a block diagram illustrating the power supply and various circuit elements within a mobile phone.

Referring to FIG. 1 a mobile phone 1 utilizes a single antenna 2 connected to a duplexer 60. The duplexer 60 links the antenna 2 to both the transmit and receive paths. It also serves to isolate the transmit signals from the receive input. The duplexer 60 directs the base station originated RF signals to the mobile phone receiver. The RX frontend 20 filters and amplifies the receive RF signal. The receive signal is then routed to the RX IF 22 where the signal is downconverted and then further filtered and amplified. The downconverted signal is then routed to the baseband processor 40. In the baseband processor 40 the receive signal is converted to audio to be played on a speaker or to messages to be shown on a display (interface hardware not shown).

In the opposite signal path, user input in the form of voice signals to a microphone or keypad presses are routed to the baseband processor 40 to be digitized and modulated onto an IF. The transmit signal is then routed to the TX IF 32 where the signal is amplified, upconverted, and filtered. The upconverted transmit signal is then routed to the TX RF 30. The TX RF 30 provides additional filtering, final RF power amplification, and reverse RF signal isolation. The RF signal is then routed to the duplexer 60 where the transmit signal is filtered and directed to the antenna 2 for transmission to the base station.

A synthesized LO 50 is generated and used in both the RX IF 22 to downconvert the receive signal and in the TX IF 32 to upconvert the transmit signal. Careful planning during the design of the frequency plan of the mobile phone 1 allows the LO frequency to be the same for the frequency conversions in the RX IF 22 and TX IF 32.

A SMPS 10 is used to convert the unregulated battery voltage (not shown) to the regulated supply voltage 18 used to supply the various modules. The regulated output 18 of the SMPS 10 directly provides supply voltage to various modules. However, the SMPS output 18 also serves as the input voltage to subsequent LDO linear regulators 12 and 14. These LDO linear regulators 12 and 14 are used to provide extremely stable supply voltages to supply sensitive circuits. Circuits that are supply sensitive may include Low Noise Amplifiers (LNAs) in the RF Frontend 20 and the Synthesized LO 50. Additional circuits (not shown) associated with the Synthesized LO 50 that are supply sensitive include the reference oscillator and the Voltage Controlled Oscillator (VCO). In addition to providing extremely stable supply voltage, the LDO regulators 12 and 14 provide power supply isolation. Noise induced on the voltage output of the LDO regulators, 12 and 14, are isolated from the input of the LDO regulator 12 and 14. Thus where two noisy devices are located in close physical proximity LDO regulators 12 and 14 are used to provide power supply isolation. Without the LDO regulators, 12 and 14, the noise from one device are induced onto the supply voltage of the adjacent devices.

Referring to FIG. 2 a SMPS 100 is provided an input voltage Vin 110, and produces an output voltage Vout 120. The SMPS 100 can be configured to provide multiple output voltages but, for purposes of clarity, only one output voltage is depicted in FIG. 2. Vin 110 could come directly from a battery source or could represent battery voltage that has passed through some preliminary conditioning circuit such as a filter, reverse polarity protection, or over-voltage protection circuit. Alternatively, the source need not be a battery but could represent any external voltage source. For an anticipated range of Vin 110, the SMPS 100 is configured to provide a nominal output voltage Vout 120. Vout 120 is used as the input voltage for subsequent LDO regulators 200, 210, 220, and 230. A plurality of LDO regulators 200, 210, 220, and 230 are shown in FIG. 2, however only a minimum of one LDO regulator is required for operation of the invention.

A plurality of LDO regulators 200, 210, 220, and 230 connected in parallel is shown in FIG. 2. The plurality of LDO regulators may, but are not required to, output the same voltage. As discussed above, one might choose to use multiple LDO regulators with identical output voltages to provide increased isolation between the voltage rails of sensitive devices. Noise induced on Vl 202 from loads operating off of LDO1 200 is isolated from the outputs of LDO2-LDOn 210, 220, and 230. Another reason for using multiple identical LDO regulators is also related to noise on the voltage supply. When a plurality of identical LDO regulators are used, each regulator can physically be positioned as near as practical to the supply sensitive device. This minimizes noise coupling onto the voltage supply. When voltage from a single regulator is routed to numerous relatively distant locations on a printed wiring board there is an increased possibility of noise coupling onto the voltage supply prior to the sensitive device. An additional reason for using a plurality of the same regulator may be physical constraints. It may be easier to physically package and route multiple small regulators than one large regulator. Where a plurality of regulators having the same output voltage are used in parallel, the minimum input voltage required to guarantee full output regulation will be nearly identical for all of the regulators.

Where a plurality of regulators not having the same output voltage are used in parallel, the benefits of the present invention are maximized if the minimum voltage required to guarantee full output regulation is approximately the same for all parallel regulators. This is possible due to different input/output voltage specifications on the various regulators. As an example, an extremely low current 3.3 V LDO regulator may only require a 0.1 V input/output voltage differential whereas a higher current 3.1 V LDO regulator may require a 0.3 V input/output voltage differential. The resultant minimum input voltage required for full regulation is nominally 3.4 V for both regulators yet the output voltages are different.

Whether the output voltages from the parallel LDO regulators are the same or different a line connects each LDO regulator output to an LDO Output Bus 310. The LDO Output Bus 310 connects each regulator output to a multiplexer and ADC 300. The multiplexer and ADC 300 may be separate devices or may be combined in a single device. The multiplexer is clocked to sequentially present one of the LDO regulator outputs to the ADC. The ADC converts each of the LDO regulator output voltages into a digital value and sends the digital value to a digital processor 400. The number of bits in the ADC is determined by the desired voltage accuracy. One Least Significant Bit (LSB) corresponds to approximately 20 mV in an 8-bit ADC that has a 5 V full scale range. When a 10-bit ADC is used one LSB corresponds to approximately 5 mV if 5 V is the full scale range.

The multiplexer and ADC 300 can be clocked synchronously or asynchronously to the SMPS switching frequency. Since the LDO regulators should eliminate any noise contributed by the SMPS the choice is arbitrary. However, if the LDO regulators do not eliminate all of the SMPS noise there are arguments in favor of each implementation. If the ADC conversion is synchronous to the SMPS switching frequency the voltage measurements will always be taken at the same time relative to the SMPS conversion. This effectively removes the noise contributed by the SMPS from the feedback loop. This may allow for a faster control loop but sacrifices the ability to measure the noise contribution of the SMPS. If the ADC is asynchronous to the SMPS switching frequency the ADC clock can be chosen to ensure that the voltage is measured across the complete SMPS cycle. This ensures that samples will be taken at the peaks and valleys of the SMPS output ripple as well as during the time the switching spike occurs. One drawback of this approach is that the instantaneous voltage sampled may not closely represent the mean LDO regulator output. This would be the case if a switching spike, which was not filtered by the LDO regulator, was sampled. One remedy would be to average multiple samples to achieve a mean voltage value. This implementation results in a slower control loop. Asynchronously sampling the LDO regulator output voltage may provide a method for verifying the performance of the LDO regulators. However, as stated above, synchronizing the sampling frequency will largely not be an issue since the reason for using the LDO regulator is to eliminate SMPS noise and provide an extremely clean supply voltage.

The rate of ADC should be no greater than the SMPS switching frequency and ideally is much lower. Since the control loop is unable to change the output voltage of the SMPS at a rate faster than the switching frequency it makes no sense to sample the output of each regulator at a rate higher than the SMPS switching frequency. Moreover, it is the purpose of the control loop to conserve power and maximize efficiency. Since power consumption of CMOS devices is roughly proportional to the operating frequency, minimizing the sampling frequency reduces the power consumption of the control loop. The LDO regulator output voltages are stable over time and will largely only be affected by temperature and load changes. The sampling frequency can be chosen to allow the control loop to operate on the order of the anticipated load changes. In a CDMA mobile phone these load changes will typically occur at slower than a 10 kHz rate. Therefore, the rate at which each LDO regulator output is sampled is on the order of 10 kHz. The actual control loop frequency, and therefore the desired sampling frequency, is not constrained by the analysis shown herein but is subject to many design constraints and would vary according to the specifics of each actual application.

The digital processor 400 converts the digitized samples into a control signal to be fed back to the SMPS. For simple control loops incorporating only a single LDO regulator the digital processor can be as simple as a resistive divider network used to control the voltage feedback control line to the SMPS Pulse Controller 130. The Pulse Controller 130 can be a Pulse Width Modulator (PWM), a Pulse Frequency Controller, a Pulse Skipping Mode Controller, or any other pulse controller that may be chosen by one of ordinary skill in the art. Each bit on the ADC sampled output would control a switch connecting a resistor to ground. The other end of the resistor would connect to the feedback control line of the Pulse Controller 130 within the SMPS 100. When the bit on the sampled value is high the resistor is switched to ground. When the bit on the sampled value is low the switch is open and the resistor is open circuited. Alternatively, when the bit on the sampled value is low the switch could be closed and when the bit on the sampled value is high the switch could be opened. The specific requirements of each Pulse Controller 130 would determine the function of the switches.

More complicated digital processors provide increased levels of control. A mobile phone typically uses a general purpose processor. This processor could be used as the digital processor 400. The digital processor 400 averages a number of samples to establish a mean value of the LDO regulator voltage. SMPS output voltage control is based upon the calculated average. Individual samples are compared to the calculated average to give instantaneous measurements of the voltage ripple about the average. Additionally, the output of the LDO regulator can be correlated to the control signal sent to the SMPS 100. When the LDO regulator is not in full regulation an increase in the voltage out of the SMPS 100 results in an increase in the voltage out of the LDO regulator. When the output of the SMPS 100 is increased but there is no increase in the LDO regulator output voltage the LDO regulator is in full regulation. Thus the digital processor 400 can determine the minimum voltage required to maintain full regulation within the LDO regulator 200, 210, 220, or 230. If the regulated output voltage of the LDO regulator decreases as the temperature of the device increases, the digital processor will not try to increase the SMPS output voltage to compensate for this. The digital processor 400 can determine that an increase in the SMPS output voltage 120 would result in no change to the output voltage of the LDO regulator 202, 204, 206, or 208. Where multiple parallel LDO regulators are used the digital processor determines the minimum SMPS output voltage required to maintain full regulation in all of them.

The digital processor 400 may also include an area of memory 410 in which is stored the values of the nominal regulated output voltage and acceptable tolerance of each LDO regulator output. The digital processor 400 is able to signal a fault within the power supply if the steady state value or voltage ripple of any of the LDO regulators exceeds its tolerance. The digital processor 400 is able to localize the fault to the particular LDO regulator stage that has exceeded tolerances.

Control over the output voltage 120 of a SMPS 100 generated from digitized samples of the output voltage of subsequent LDO regulator stages allows the SMPS 100 to operate at the minimum voltage required to ensure the LDO regulators will operate at full regulation. This serves to maximize the efficiency of the mobile phone as a whole. Moreover, corollary benefits of voltage monitoring are easily obtained using the same sampling and digital processing hardware.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. An apparatus for optimizing an output voltage of a Switch Mode Power Supply (SMPS) used as an input voltage for a minimum of one linear regulator, each linear regulator generating an output voltage, said apparatus comprising:

an output bus connected to each linear regulator output;

a multiplexer connected to said output bus for generating successive samples of each linear regulator output;

an Analog to Digital Converter (ADC) for receiving the successive samples and generating digitized output voltage samples; and a digital processor connected to the ADC for processing the digitized output voltage samples supplied from the ADC;

wherein the digital processor generates a feedback signal provided to a control line that controls the output voltage of the SMPS.

2. The apparatus of claim 1 wherein the digital processor generates the feedback signal to control the output voltage of the SMPS to provide a minimum value of SMPS output voltage required to maintain full regulation in all subsequent linear regulators operating off of the controlled SMPS output voltage.

3. The apparatus of claim 1 wherein the linear regulators are Low Drop Out (LDO) regulators.

4. An apparatus for optimizing an output voltage of a Switch Mode Power Supply (SMPS), wherein said SMPS output voltage is used as an input voltage for linear regulators, each linear regulator generating an output voltage, said apparatus comprising:

means for successively sampling the output voltages of each of said linear regulators;

means for generating digitized successive samples of each of the linear regulator output voltages; and means for processing said digitized samples;

wherein the processing means generates a feedback signal provided to the SMPS to control the output voltage of the SMPS.

5. The apparatus of claim 4 wherein the processing means generates the feedback signal to control the output voltage of the SMPS to provide a minimum value of SMPS output voltage required to maintain full regulation in all subsequent linear regulators operating off of the controlled SMPS output voltage.

6. A method for optimizing an output voltage of a Switch Mode Power Supply (SMPS), wherein said SMPS output voltage is used as an input voltage for subsequent linear regulators, comprising:

sampling each linear regulator output voltage;

multiplexing the linear regulator output voltage samples;

digitizing the multiplexed output voltage samples;

processing the digitized samples to generate a feedback control signal; and applying the feedback control signal to a control line of the SMPS to control the SMPS output voltage.

7. The method of claim 6 wherein the feedback control signal controls the SMPS output voltage to a minimum voltage required to maintain full regulation in all subsequent linear regulators operating off of the controlled SMPS output voltage.

* * * * *